United States Patent [19]
Ohmi

[11] Patent Number: 5,977,516
[45] Date of Patent: Nov. 2, 1999

[54] WELDED MEMBERS PIPING SYSTEM AND WELDING METHOD AND CLEAN ROOM

[76] Inventor: Tadahiro Ohmi, 1-17-301, Komegabukuro 2-chome, Aoba-ku, Sendai-shi, Miyagi-ken 980, Japan

[21] Appl. No.: 09/093,530

[22] Filed: Jun. 2, 1998

Related U.S. Application Data

[62] Division of application No. 08/710,735, Sep. 20, 1996.
[51] Int. Cl.$^6$ .................................................. B23K 9/167
[52] U.S. Cl. .................................. 219/137 WM; 219/61; 219/75
[58] Field of Search ................................. 219/61, 125.11, 219/137 R, 137 WM, 60 A, 60 R, 74, 75

[56] References Cited

U.S. PATENT DOCUMENTS

| | | |
|---|---|---|
| 3,677,908 | 7/1972 | Sperl . |
| 4,119,765 | 10/1978 | Pinnow et al. . |
| 4,685,707 | 8/1987 | Miyashita . |
| 4,853,284 | 8/1989 | Ishii et al. . |
| 4,950,522 | 8/1990 | Amend et al. . |
| 5,440,090 | 8/1995 | Davis et al. . |

*Primary Examiner*—Clifford C. Shaw
*Attorney, Agent, or Firm*—Randall J. Knuth

[57] ABSTRACT

A welding method in which the outer-most surfaces of ferritic stainless steel contains chromium oxide surfaces with no iron oxides. The welding method includes flowing a gas having an oxidizing activity over the welded part while applying an arc to the welded part, which is insufficient to melt the welded part. The resulting welded stainless steel is suitable for use as clean room gas supply lines.

39 Claims, 5 Drawing Sheets

WELDED MEMBERS PIPING SYSTEM AND WELDING METHOD AND CLEAN ROOM

This is a divisional Continued Prosecution Application of Ser. No. 08/710,735, filed Sep. 20, 1996 pending.

BACKGROUND OF THE INVENTION

1. Field of the Invention.

The present invention relates to welded members, piping, a piping system, and to a welding method and a clean room.

2. Description of the Related Art.

Gas supply pipes are employed in which, after a passivated film, the surface of which comprises solely chromium oxide (does not contain iron oxides) is formed on the inner surface of pipes comprising an austenitic stainless steel such as SUS 316 or the like, the pipes are welded together.

However, when such gas supply pipes are employed, the life span of the pipes is extremely short. Accordingly, it is necessary to replace the pipes at extremely short intervals, and this involves a great deal of work and expense. Furthermore, as a result of such replacement, there is a tendency for the degree of cleanliness within the clean room to decline.

Upon investigating the causes of the short lifespan of such pipes, the present inventors have discovered that passivated films containing iron oxides are formed at the welded parts, and corrosion is generated at these parts.

Problem to be Solved by the Invention

The present invention has an object thereof to provide welded members and pipes having superior corrosion resistance.

The present invention has an object thereof to provide a piping system which has a very long life span and which requires almost no replacement.

The present invention has an object thereof to provide a maintenance-free clean room having a high degree of cleanliness.

The present invention has an object thereof to provide a welding method which is capable of producing welded parts having superior corrosion resistance.

SUMMARY OF INVENTION

Means for Solving the Problems

The welded members of the present invention are characterized in that the outermost surfaces of the welded parts at which ferritic stainless steel is welded together are chromium oxide surfaces containing no iron oxides.

The piping of the present invention is characterized in that the outermost surface of the welded parts at which pipes comprising ferritic stainless steel are welded together are chromium oxide surfaces containing no iron oxides.

The piping system of the present invention is characterized in that pipes are employed in which the outermost surfaces of the welded parts at which pipes comprising ferritic stainless steel are welded together are chromium oxide surfaces containing no iron oxides.

The welding method of the present invention is characterized in that, after welding ferritic stainless steel together, a gas possessing oxidizing activity is caused to flow over the welded part, and an arc which is not sufficient to melt the welded part is applied to the welded part.

The clean room of the present invention is characterized in that the gas supply pipes disposed within the clean room are pipes in which the outermost surface of the welded part at which pipes comprising ferritic stainless steel are welded to one another is a chromium oxide surface containing no iron oxides.

Embodiment Modes of the Invention

The ferritic stainless steel employed in the present invention should preferably be stainless steel containing 25 weight percent or more of chromium.

By means of setting the welding current after welding to 3–6A, it is possible to more satisfactorily form a passivated film comprising chromium oxide which does not contain iron oxides. when the current is less that 3A, the arc generation is insufficient, and a long period of time is required for the formation of a passivated film comprising chromium oxide which does not contain iron oxides. On the other hand, when the current is in excess of 6A, there is a possibility that the welded part will melt. Accordingly, the range of 3–6A is preferable.

The gas having an oxidizing activity which is caused to flow after welding is preferably a gas in which oxygen is contained in argon gas.

At this time, it is preferable that the oxygen concentration bp 5 ppm or greater and less than 50 ppm. When the concentration is less than 5 ppm, a passivated film containing iron oxides may be formed depending on the conditions, and the control of these conditions is difficult. When the concentration is greater than or equal to 50 ppm, the oxygen may be in excess depending on the conditions, so that a passivated film containing iron oxides may be formed. A concentration within a range of 25 ppm–35 ppm is especially preferable.

Hydrogen may be added to the mixed gas of argon and oxygen. In such a case, the surface roughness will decrease, and this is preferable.

A gas in which moisture is contained in argon gas may be employed as the gas having an oxidizing activity.

The rotational speed after welding should preferably be within a range of, for example, 6–8 rpm in the case of a pipe having a ¼ inch diameter. At speeds of less than 4 rpm, the passivated film becomes too thick (400 Å or more), and peeling may occur. Furthermore, when the speed is in excess of 8 rpm, there are cases in which no passivated film is formed.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Experimental Example 1

Pipes having a diameter of ¼ inch and comprising ferritic stainless steel (brand name: FS 10) were subjected to oxidation treatment in an atmosphere of hydrogen, oxygen, and argon gas having a moisture concentration of 100 ppm, and a 100% chromium oxide passivated film was formed on the inner surfaces of the pipes.

Next, the welding of the ferritic stainless steel pipes on which a 100% chromium oxide film has been formed was conducted by means of the tungsten inert gas welding method. In this welding method, welding was conducted initially for 1 revolution, and then oxide passivation treatment was conducted under conditions such that the welding speed of the second revolution was 3 rpm, and the current was 3 A.

The bead width (BW) of the weld was set at 2 mm. Furthermore, welding was conducted while allowing a back shield gas to flow within the pipes. Welding was conducted using back shield gases (BGS) in which a variety of concentrations of oxygen was added to argon gas. The welded pipe samples obtained were produced under conditions such that the following oxygen concentrations were added: (a) no oxygen added, (b) 1 ppm, (c) 50 ppm.

Figure 1:
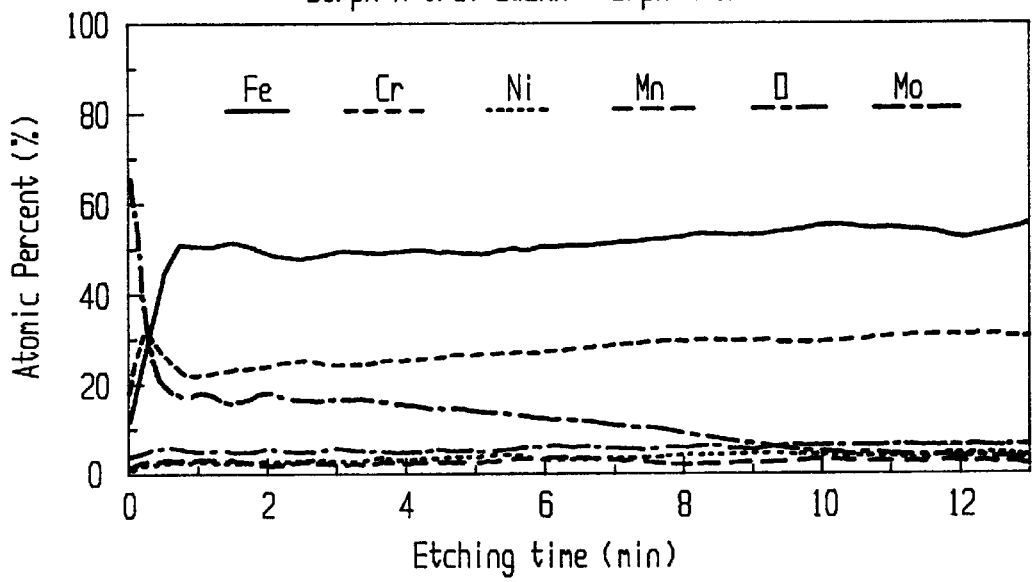
FIG. 1 is a graph showing the results of an XPS test of a passivated film formed in accordance with (a) of experimental example 1.
Figure 2:
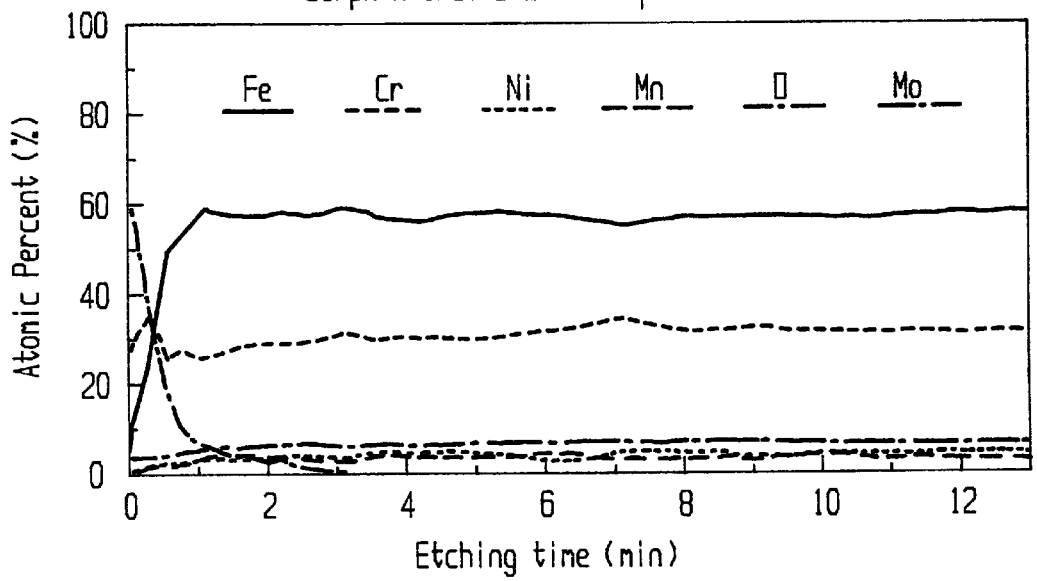
FIG. 2 is a graph showing the results of an XPS test of a passivated film formed in accordance with (b) of experimental example 1.
Figure 3:
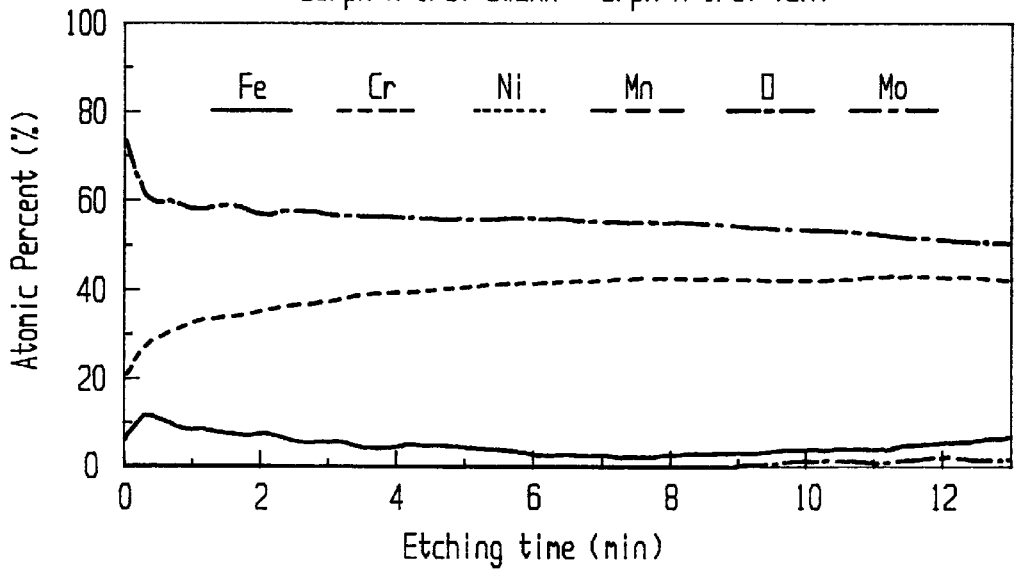
FIG. 3 is a graph showing the results of an XPS test of a passivated film formed in accordance with (c) of experimental example 1.

After the conclusion of welding, the pipes were severed, and the component distribution in the direction of depth of the surface of the welded part was analyzed using XPS (X-ray photoelectric spectroscopy). The results thereof are shown in FIG. 1 (in the case of (a)), FIG. 2 (in the case of (b)), and FIG. 3 (in the case of (c)). Furthermore, the horizontal axis in these diagrams indicated the etching time of the surface by means of sputtering; one minute of etching time corresponds to approximately a film thickness of 7 nm.

As is clear from the figures, the case in which 1 ppm of oxygen was added to the back shield gas (FIG. 2) exhibited results which were essentially identical with those of the case in which no oxygen was added and welding was conducted (FIG. 1); it can be seen that the amount of oxygen added was insufficient for the formation of a chromium oxide passivated film. Furthermore, it can be seen that in the case in which an oxygen concentration of 50 ppm was added and welding was conducted (FIG. 3), 100 nm or more of an oxide passivated film comprising a mixture of iron and chromium oxides was formed, so that oxygen was present in excess.

Experimental Example 2

Ferritic stainless steel pipes having a diameter of ¼ inch were subjected to an oxidation treatment in an atmosphere of hydrogen, oxygen, and argon gases containing a moisture concentration of 100 ppm, and a 100% chromium oxide passivated film was formed on the inner surfaces of these pipes.

Figure 4:
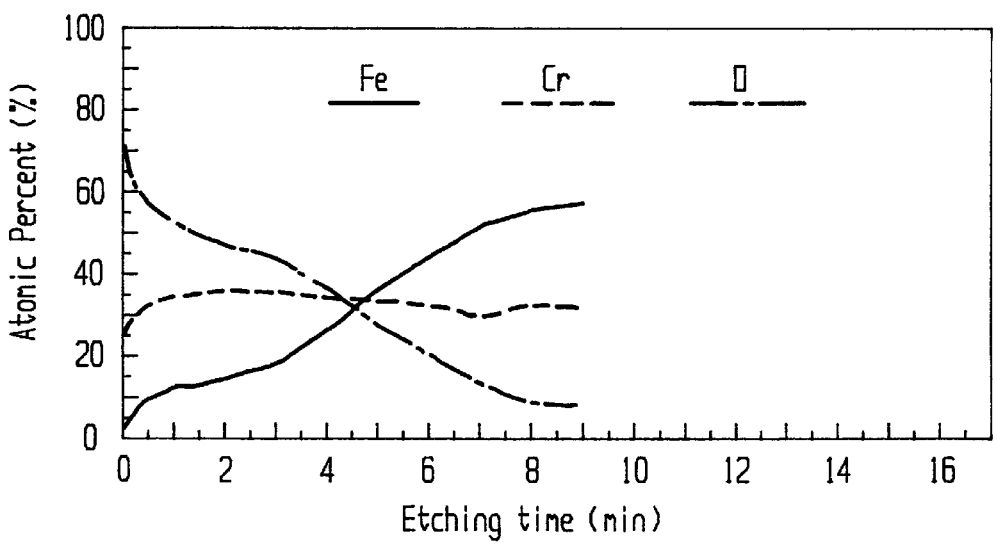
FIG. 4 is a graph showing the results of an XPS test of a passivated film formed in accordance with (a) of experimental example 2.
Figure 5:
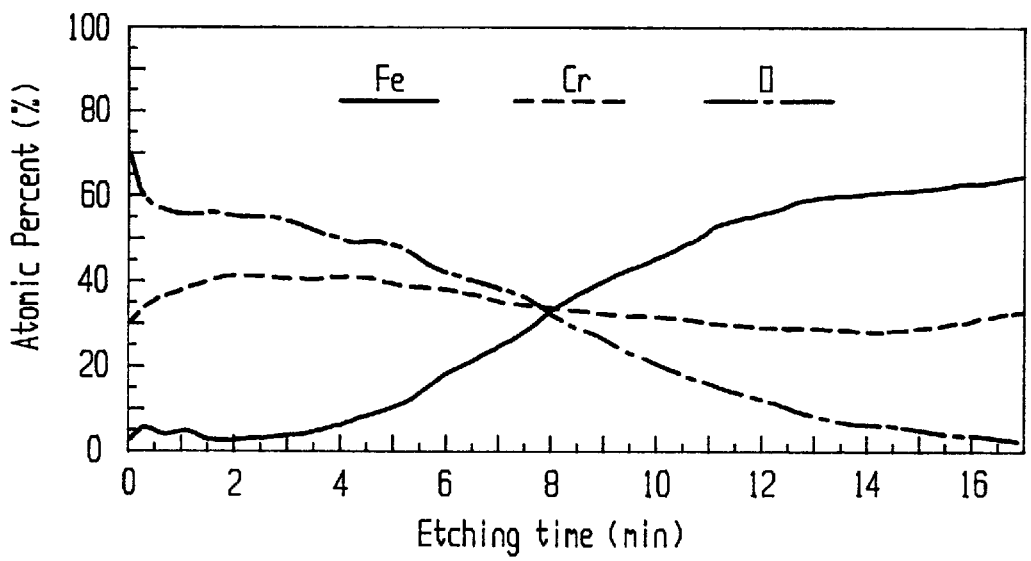
FIG. 5 is a graph showing the results of an XPS test of a passivated film formed in accordance with (b) of experimental example 2.
Figure 6:
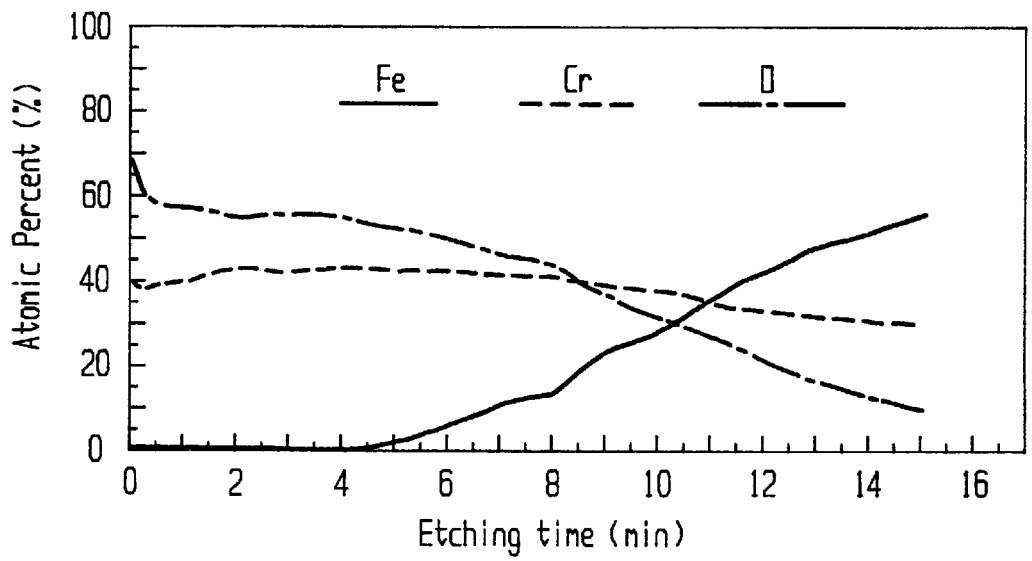
FIG. 6 is a graph showing the results of an XPS test of a passivated film formed in accordance with (c) of experimental example 2.

Next, the ferritic stainless steel pipes having a 100% chromium oxide passivated film thereon were subjected to welding by means of a tungsten inert gas welding method. In this welding method, welding was conducted initially for one revolution, and then the welded bead was rotated for 0–3 revolutions under conditions such that the welding speed was 6 rpm from the second revolution onward, and the current was 3 A, and oxide passivation treatment was thus conducted. Welding was conducted using, as a back shield gas, argon gas to which 30 ppm of oxygen gas had been added. The welded pipe samples obtained were produced using the following revolutions: (a) 0 revolutions, (b) 1 revolution, (c) 2 revolutions, (d) 3 revolutions. After the completion of welding, the pipes were severed, and the component distribution in the direction of depth of the surface of the welded part was analyzed using XPS (X-ray photoelectric spectroscopy). the results thereof are shown in FIG. 4 (in the case of (a)), FIG. 5 (in the case of (b)), and FIG. 6 (in the case of (c)). Furthermore, the horizontal axis in the figures indicated the etching time of the surface by means of sputtering; an etching time of 1 minute corresponds to a film thickness of approximately 7 nm.

As is clear from the figures, it can be seen that an oxide film is formed under any conditions in which the number of revolutions is within a range of 0–3. It can be seen that under these conditions, in the case in which the number of revolutions is 2 (FIG. 6) and 3, the oxide passivated film contains no iron to a depth of approximately 30 nm from the outermost surface, so that a 100% chromium oxide passivated film is formed.

Experimental Example 3

Ferritic stainless steel pipes having a diameter of ¼ inch were subjected to an oxidation treatment in an atmosphere of hydrogen, oxygen, and argon gases containing a moisture concentration of 100 ppm, and 100% chromium oxide passivated film was formed on the inner surfaces of the pipes.

Next, the ferritic stainless steel pipes having a 100% chromium oxide passivated film formed thereon were subjected to welding by means of a tungsten inert gas welding method. In this welding method, welding was initially conducted for one revolution and then the welded bead was rotated for three revolutions under conditions such that the welding speed was 6 rpm from the second revolution onward, and the current was 3 A, and oxide passivation treatment was thus conducted. Welding was conducted using a variety of back shield gases in which a variety of concentrations of oxygen gas were added to argon gas. The welded pipe samples obtained were produced under oxygen concentrations of: (a) 25 ppm, (b) 30 ppm, and (c) 35 ppm.

Figure 7:
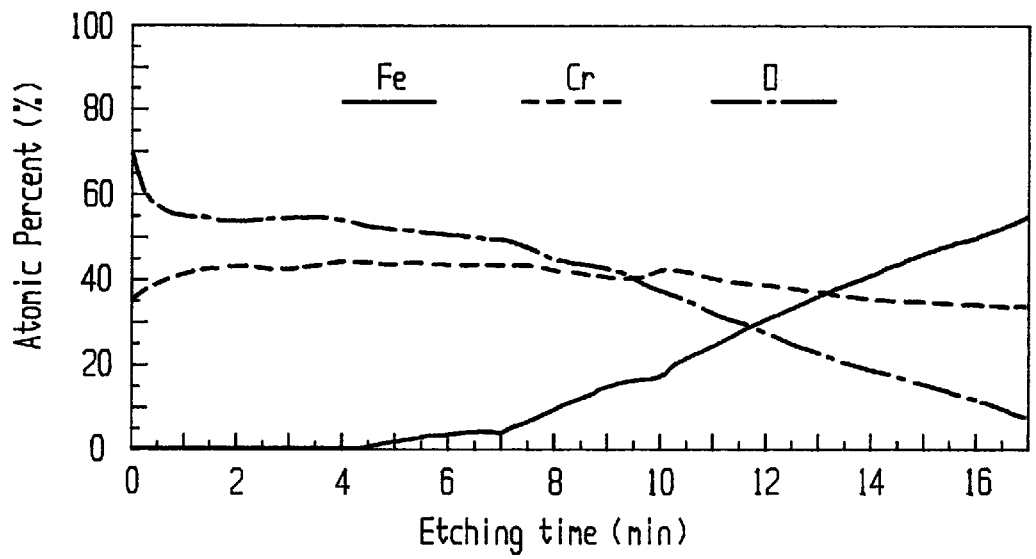
FIG. 7 is a graph showing the results of an XPS test of a passivated film formed in accordance with (d) of experimental example 2.
Figure 8:
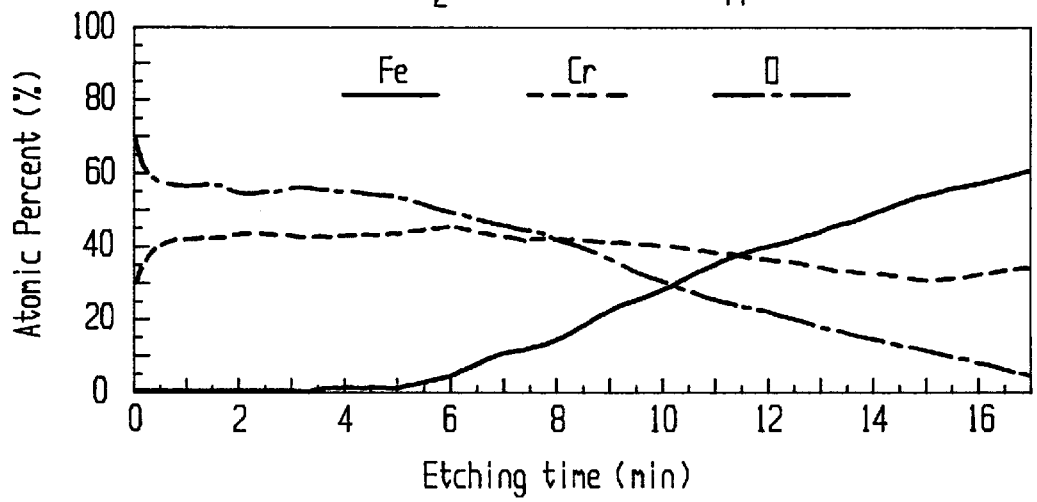
FIG. 8 is a graph showing the results of an XPS test of a passivated film formed in accordance with (a) of experimental example 2.
Figure 9:
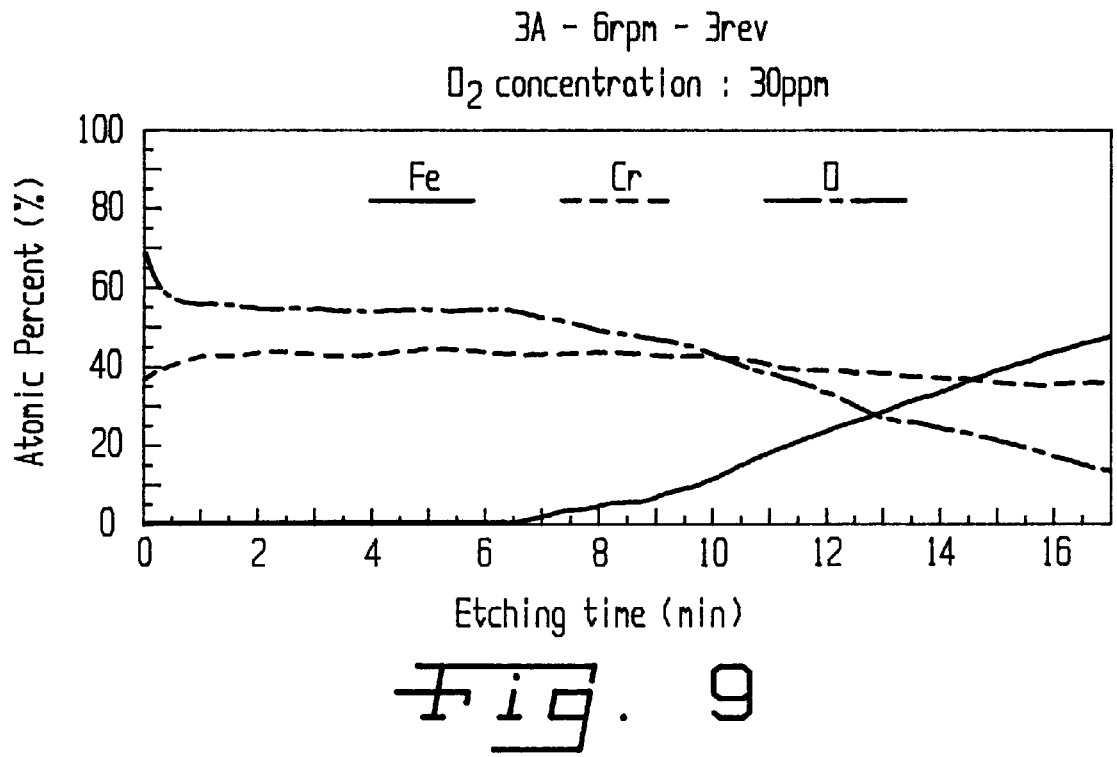
FIG. 9 is a graph showing the results of an XPS test of a passivated film formed in accordance with (b) of experimental example 3.
Figure 10:
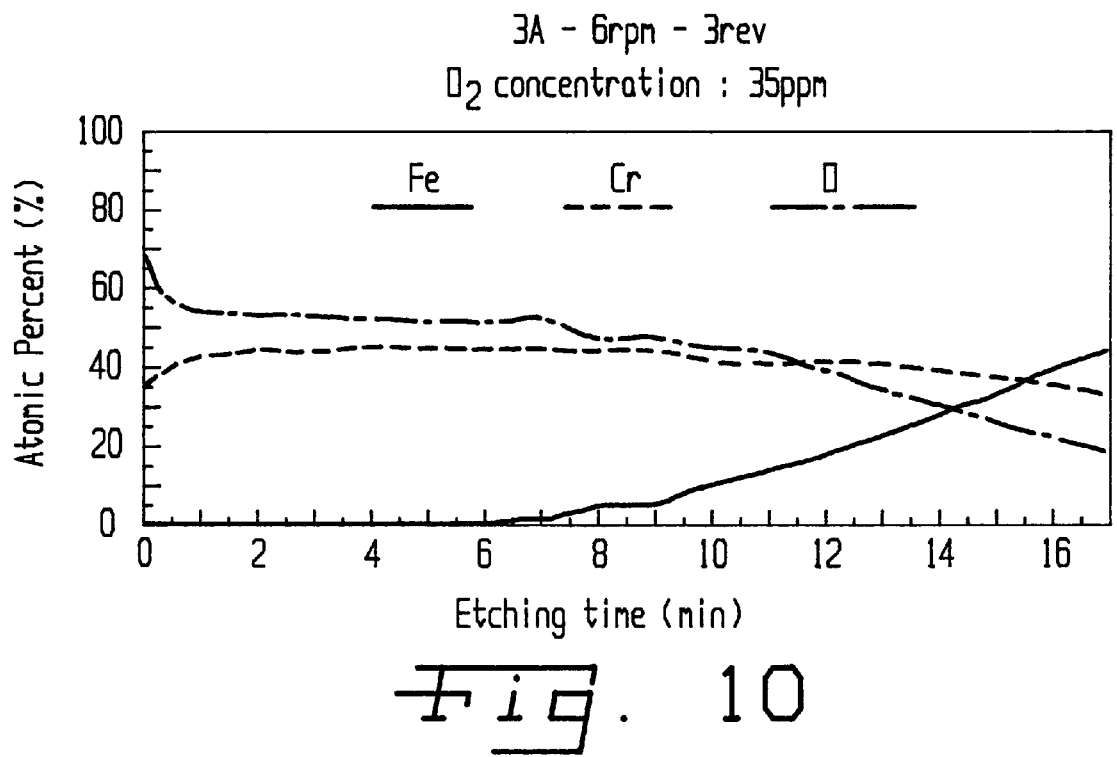
FIG. 10 is a graph showing the results of an XPS test of a passivated film formed in accordance with (c) of experimental example 3.

After the completion of welding, the pipes were severed, and the component distribution in the direction of depth of the surface of the welded part was analyzed using XPS (X-ray photoelectric spectroscopy). The results are shown in FIG. 7 (in the case of (a)), FIG. 8 (in the case of (b)), and FIG. 9 (in the case of (c)). Furthermore, the horizontal axis in the figures indicated the etching time of the surface by means of sputtering; an etching tim of 1 minute corresponds to a film thickness of approximately 7 nm.

As it is clear from the figures, under these conditions (current, rotational speed, number of revolutions) a 100% chromium oxide passivated film containing absolutely no iron is formed to a film thickness of a few tens of nm from the outer most surface in the region in which the oxygen concentration is within a range of 25 ppm–35 ppm.

Effects of the Invention

In accordance with the present invention, it is possible to provide welded members and pipes having superior corrosion resistance.

In accordance with the present invention, it is possible to provide a piping system having a long life span and which requires almost no replacement.

In accordance with the present invention, it is possible to provide a maintenance-free clean room having a high degree of cleanliness.

In accordance with the present invention, it is possible to provide a welding method which is capable of producing welded members having superior corrosion resistance.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A welding method, comprising the steps:
   welding ferritic stainless steels to one another;
   flowing a gas having an oxidizing activity over the welded part; and
   applying an arc current to the welded part which is insufficient to melt the welded part.

2. A welding method according to claim 1, wherein said ferritic stainless steel comprises stainless steel containing 25 weight % or more of chromium.

3. A welding method according to claims 2, further comprising the step:
   setting the arc current to within a range of 3–6 A after welding.

4. A welding method according to claim 3, wherein said gas having an oxidizing activity comprises a gas in which oxygen is contained in argon gas.

5. A welding method according to claim 4, wherein said oxygen is at a concentration 25 ppm or more and 50 ppm or less.

6. A welding method according to claim 5, further comprising the step:
   adding hydrogen to said gas.

7. A welding method according to claim 5, further comprising the step:
   rotating the welded stainless steel at a speed within a range of 6–8 rpm while applying the arc current.

8. A welding method according to claim 4, further comprising the step:
   adding hydrogen to said gas.

9. A welding method according to claim 4, further comprising the step:
   rotating the welded stainless steel at a speed within a range of 6–8 rpm while applying the arc current.

10. A welding method according to claim 3, wherein said gas having an oxidizing activity comprises a gas in which moisture is contained in argon gas.

11. A welding method according to claim 10, further comprising the step:
    rotating the welded stainless steel at a speed within a range of 6–8 rpm while applying the arc current.

12. A welding method according to claim 3, further comprising the step:
    rotating the welded stainless steel at a speed within a range of 6–8 rpm while applying the arc current.

13. A welding method according to claim 2, wherein said gas having an oxidizing activity comprises a gas in which oxygen is contained in argon gas.

14. A welding method according to claim 13, wherein said oxygen is at a concentration of 25 ppm or more and 50 ppm or less.

15. A welding method according to claim 14, further comprising the step:
    adding hydrogen to said gas.

16. A welding method according to claim 14, further comprising the step:
    rotating the welded stainless steel at a speed within a range of 6–8 rpm while applying the arc current.

17. A welding method according to claim 13, further comprising the step:
    adding hydrogen to said gas.

18. A welding method according to claim 17, further comprising the step:
    rotating the welded stainless steel at a speed within a range of 6–8 rpm while applying the arc current.

19. A welding method according to claim 13, further comprising the step:
    rotating the welded stainless steel at a speed within a range of 6–8 rpm while applying the arc current.

20. A welding method according to claim 2, wherein said gas having an oxidizing activity comprises a gas in which moisture is contained in argon gas.

21. A welding method according to claim 2, further comprising the step:
    rotating the welded stainless steel at a speed within a range of 6–8 rpm while applying the arc current.

22. A arc method according to claim 1, further comprising the step:
    setting the arc current to within a range of 3–6 A after welding.

23. A welding method according to claim 22, wherein said gas having an oxidizing activity comprises a gas in which oxygen is contained in argon gas.

24. A welding method according to claim 23, wherein said oxygen is at a concentration of 25 ppm or more and 50 ppm or less.

25. A welding method according to claim 24, further comprising the step:
    adding hydrogen to said gas.

26. A welding method according to claim 24, further comprising the step:
    rotating the welded stainless steel at a speed within a range of 6–8 rpm while applying the arc current.

27. A welding method according to claim 23, further comprising the step:
    adding hydrogen to said gas.

28. A welding method according to claim 23, further comprising the step:
    rotating the welded stainless steel at a speed within a range of 6–8 rpm while applying the arc current.

29. A welding method according to claim 22, wherein said gas having an oxidizing activity comprises a gas in which moisture is contained in argon gas.

30. A welding method according to claim 22, further comprising the step:

rotating the welded stainless steel at a speed within a range of 6–8 rpm while applying the arc current.

31. A welding method according to claim 1, wherein said gas having an oxidizing activity comprises a gas in which oxygen is contained in argon gas.

32. A welding method according to claim 31, wherein said oxygen is at a concentration of 25 ppm or more and 50 ppm or less.

33. A welding method according to claims 32, further comprising the step:

adding hydrogen to said gas.

34. A welding method according to claim 32, further comprising the step:

rotating the welded stainless steel at a speed within a range of 6–8 rpm while applying the arc current.

35. A welding method according to claim 31, further comprising the step:

adding hydrogen to said gas.

36. A welding method according to claim 35, further comprising the step:

rotating the welded stainless steel at a speed within a range of 6–8 rpm while applying the arc current.

37. A welding method according to claim 31, further comprising the step:

rotating the welded stainless steel at a speed within a range of 6–8 rpm while applying the arc current.

38. A welding method according to claim 1, wherein said gas having an oxidizing activity comprises a gas in which moisture is contained in argon gas.

39. A welding method according to claim 1, further comprising the step:

rotating the welded stainless steel at a speed within a range of 6–8 rpm while applying the arc current.

* * * * *